United States Patent
Komori et al.

(10) Patent No.: US 10,355,469 B2
(45) Date of Patent: Jul. 16, 2019

(54) SEAL STRUCTURE FOR MULTICORE CABLE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hirokazu Komori, Yokkaichi (JP); Makoto Higashikozono, Yokkaichi (JP); Hisashi Sawada, Yokkaichi (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 16/060,508

(22) PCT Filed: Nov. 29, 2016

(86) PCT No.: PCT/JP2016/085274
§ 371 (c)(1),
(2) Date: Jun. 8, 2018

(87) PCT Pub. No.: WO2017/104392
PCT Pub. Date: Jun. 22, 2017

(65) Prior Publication Data
US 2018/0366934 A1   Dec. 20, 2018

(30) Foreign Application Priority Data
Dec. 17, 2015   (JP) .................. 2015-246030

(51) Int. Cl.
H01R 13/52 (2006.01)
H02G 15/04 (2006.01)
(Continued)

(52) U.S. Cl.
CPC ....... H02G 15/046 (2013.01); B60R 16/0222 (2013.01); H02G 15/076 (2013.01); H01R 13/5208 (2013.01)

(58) Field of Classification Search
CPC .... H01R 13/111; H01R 12/58; H01R 13/187; H01R 4/185
(Continued)

(56) References Cited

U.S. PATENT DOCUMENTS 5,362,258 A * 11/1994 Arnswald ............ H01R 13/521
439/271
8,016,603 B1 * 9/2011 Tsai ..................... H01R 13/111
439/271
(Continued)

FOREIGN PATENT DOCUMENTS

| JP | H09289057 A | 11/1997 |
| JP | H11329567 A | 11/1999 |
| JP | 2012182924 A | 9/2012 |

OTHER PUBLICATIONS

International Search Report for Application No. PCT/JP2016/085274 dated Jan. 31, 2017; 5 pages.

*Primary Examiner* — Abdullah A Riyami
*Assistant Examiner* — Nelson R. Burgos-Guntin
(74) *Attorney, Agent, or Firm* — Reising Ethington, P.C.

(57) ABSTRACT

A seal structure for a multicore cable includes a multicore cable in which a first electrical wire to a fourth electrical wire are enveloped by a sheath, a rubber plug that is fitted around an end portion of the sheath and has through-holes through which the electrical wires respectively pass, and a
(Continued)

holder having a sheath holding portion configured to hold the sheath and suppress shifting of a position of the sheath relative to the multicore cable, in which the holder has locking portion portions configured to hold the rubber plug and suppress movement of the rubber plug in a direction in which the rubber plug comes off from the end portion of the sheath.

5 Claims, 13 Drawing Sheets

(51) Int. Cl.
    *H02G 15/076*    (2006.01)
    *B60R 16/02*     (2006.01)

(58) Field of Classification Search
    USPC .................................... 439/587, 589, 271
    See application file for complete search history.

(56) References Cited

U.S. PATENT DOCUMENTS

| | | | |
|---|---|---|---|
| 8,109,789 B2 * | 2/2012 | Tyler | H01R 13/5205 |
| | | | 439/587 |
| 2013/0105219 A1 | 5/2013 | Osawa et al. | |
| 2018/0366934 A1 * | 12/2018 | Komori | H01R 13/5208 |
| 2019/0006834 A1 * | 1/2019 | Komori | H02G 15/04 |

* cited by examiner

SEAL STRUCTURE FOR MULTICORE CABLE

CROSS REFERENCE TO RELATED APPLICATIONS

This application claims the priority of Japanese patent application JP2015-246030 filed on Dec. 17, 2015, the entire contents of which are incorporated herein.

TECHNICAL FIELD

The technology disclosed in the present specification relates to a seal structure for a multicore cable.

BACKGROUND ART

Conventionally, a rubber plug as disclosed in JP H11-329567A (Patent Document 1) is known as a rubber plug for waterproofing electrical wires collectively. This rubber plug has multiple electrical wire insertion holes for the passage of respective electrical wires. The electrical wires and the rubber plug are sealed by intimate contact between the outer circumferential surfaces of the electrical wires and the inner circumferential surfaces of the electrical wire insertion holes. Also, the rubber plug and its housing are sealed by intimate contact between the outer circumferential surface of the rubber plug and an inner wall surface of a rubber plug mounting opening of the housing.

SUMMARY

In the above-described conventional technique, a cover member is detachably fitted around a rear end portion of the housing via a locking portion. The cover member has electrical wire through-holes for passage of the respective electrical wires.

According to the conventional techniques described above, for example, if a relatively strong force is applied to electrical wires, there is a concern that the rubber plug will be pulled by the electrical wires and its position shifts, so that the relative positions of the electrical wire insertion holes of the rubber plug and the electrical wire through-holes of the cover member are shifted. There is a risk that the intimacy of the contact between the outer circumferential surfaces of the electrical wires and the inner circumferential surfaces of the electrical wire insertion holes will decrease, and the seal between the electrical wires and the rubber plug will decrease.

The technology disclosed in the present specification was achieved in light of the above-described situation, and an object thereof is to improve the sealing property of a multi core cable.

The technology disclosed in the present specification includes a multicore cable in which a plurality of electrical wires are enveloped by a sheath; a rubber plug that is fitted around an end portion of the sheath and has a plurality of through-holes through which the plurality of electrical wires respectively pass; and a holder having a sheath holding portion configured to hold the sheath and suppress shifting of a position of the sheath relative to the multicore cable, in which the holder has a rubber plug holding portion configured to hold the rubber plug and suppress movement of the rubber plug in a direction in which the rubber plug comes off from the end portion of the sheath.

According to the above-described configuration, the rubber plug is prevented from coming off from the end portion of the sheath, and thus the sealing property of the multicore cable can be improved. Also, the sheath is held by the sheath holding portion. As a result, relative positions of the sheath and the rubber plug are held by the holder. Accordingly, the rubber plug is reliably pressed against the sheath and the electrical wires, and thus the sealing property of the multicore cable can be improved.

The following aspects are preferable as embodiments of the technology disclosed in the present specification.

It is preferable that a cap that is fitted around the rubber plug is included, and movement of the rubber plug in a direction in which the rubber plug comes off from the end portion of the sheath is suppressed by engagement of the rubber plug holding portion and the cap.

According to the above-described configuration, an internal pressure can be applied to the rubber plug by the cap that is fitted around the rubber plug, and thus the sealing property of the multicore cable can be further improved.

It is preferable that one of the holder and the cap is provided with a guide portion, and the other of the holder and the cap is provided with a guided portion configured to slide against the guide portion, and the rubber plug holding portion is guided by the guide portion and the guided portion sliding against each other, to a position at which the rubber plug holding portion is locked to the cap.

According to the above-described configuration, it is possible to reliably lock the holder and the cap together, and thus to reliably improve the sealing property of the multicore cable.

The holder preferably has a protection portion that covers the rubber plug holding portion.

According to the above-described configuration, contact of foreign matter with the rubber plug holding portion is suppressed. Accordingly, the release of a structure in which the rubber plug holding portion and the rubber plug are locked together is suppressed, and thus it is possible to further improve the sealing property of the multicore cable.

It is preferable that a binding member is wrapped around the sheath holding portion in a state in which the sheath holding portion is pressed inward in a radial direction.

According to the above-described configuration, the sheath is pressed inward by the binding member in the radial direction of the sheath. As a result, the sheath and the electrical wires are reliably fixed due to intimate contact between the inner circumferential surface of the sheath and the outer surfaces of the electrical wires.

According to the technology disclosed in the present specification, it is possible to improve the sealing property of a multicore cable.

DESCRIPTION OF EMBODIMENTS

Embodiment 1

Figure 4:
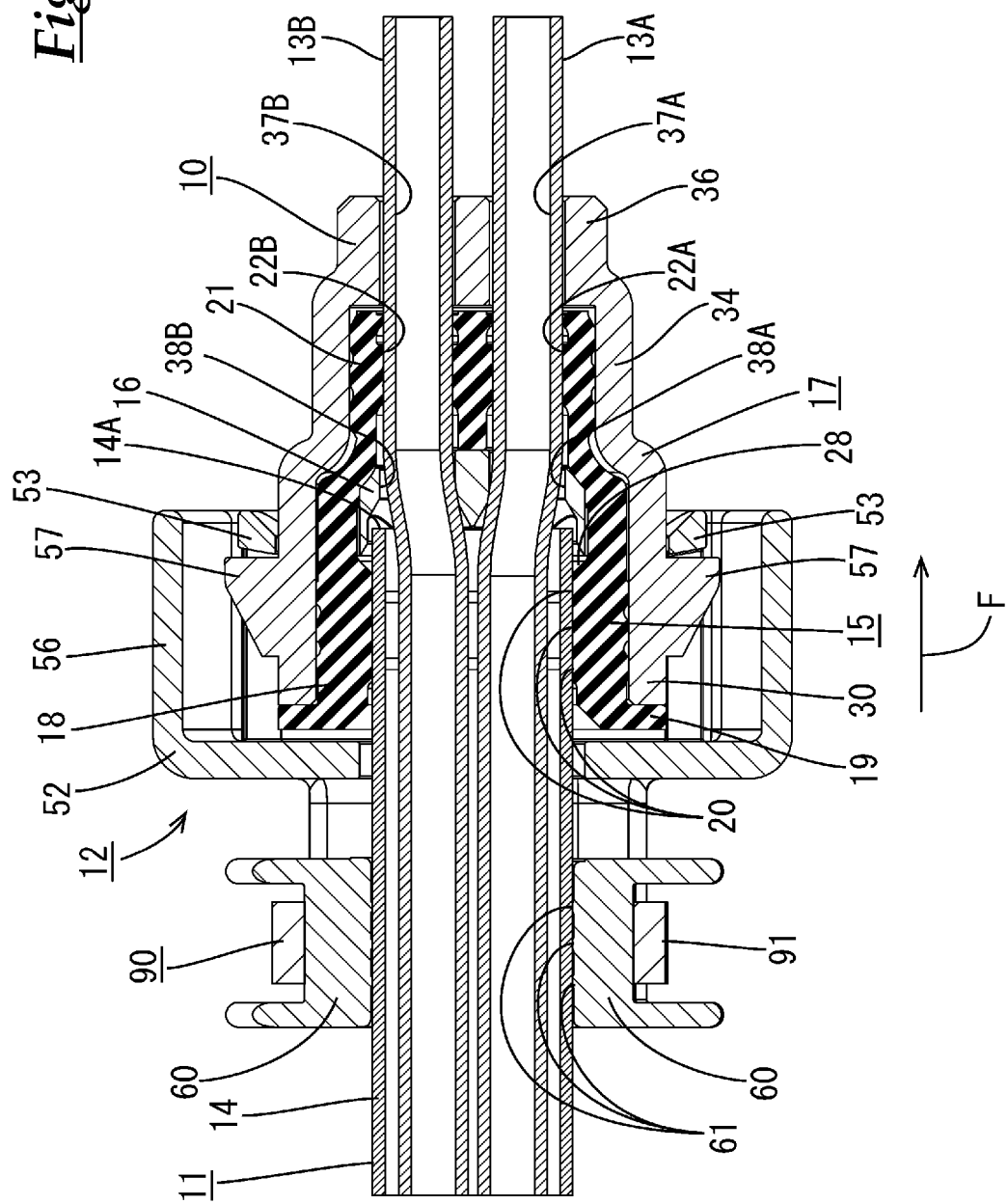
FIG. 4 is a cross-sectional view taken along line IV-IV in FIG. 3.

Embodiment 1 to which the present design is applied to a seal structure 12 for a multicore cable 11 will be described with reference to FIGS. 1 to 13. The present embodiment can be applied to a wire harness for an electrical parking brake that is installed in a vehicle (not shown), for example. As shown in FIG. 4, the seal structure 12 includes a multicore cable 11, a rubber plug 15 that is fitted around an end portion 14A of a sheath 14 of the multicore cable 11, a cap 17 that is fitted around the rubber plug 15, and a holder 52 configured to hold the multicore cable 11 and the cap 17. In the following description, the direction represented by arrow F is considered to be the frontward direction.

Figure 1:
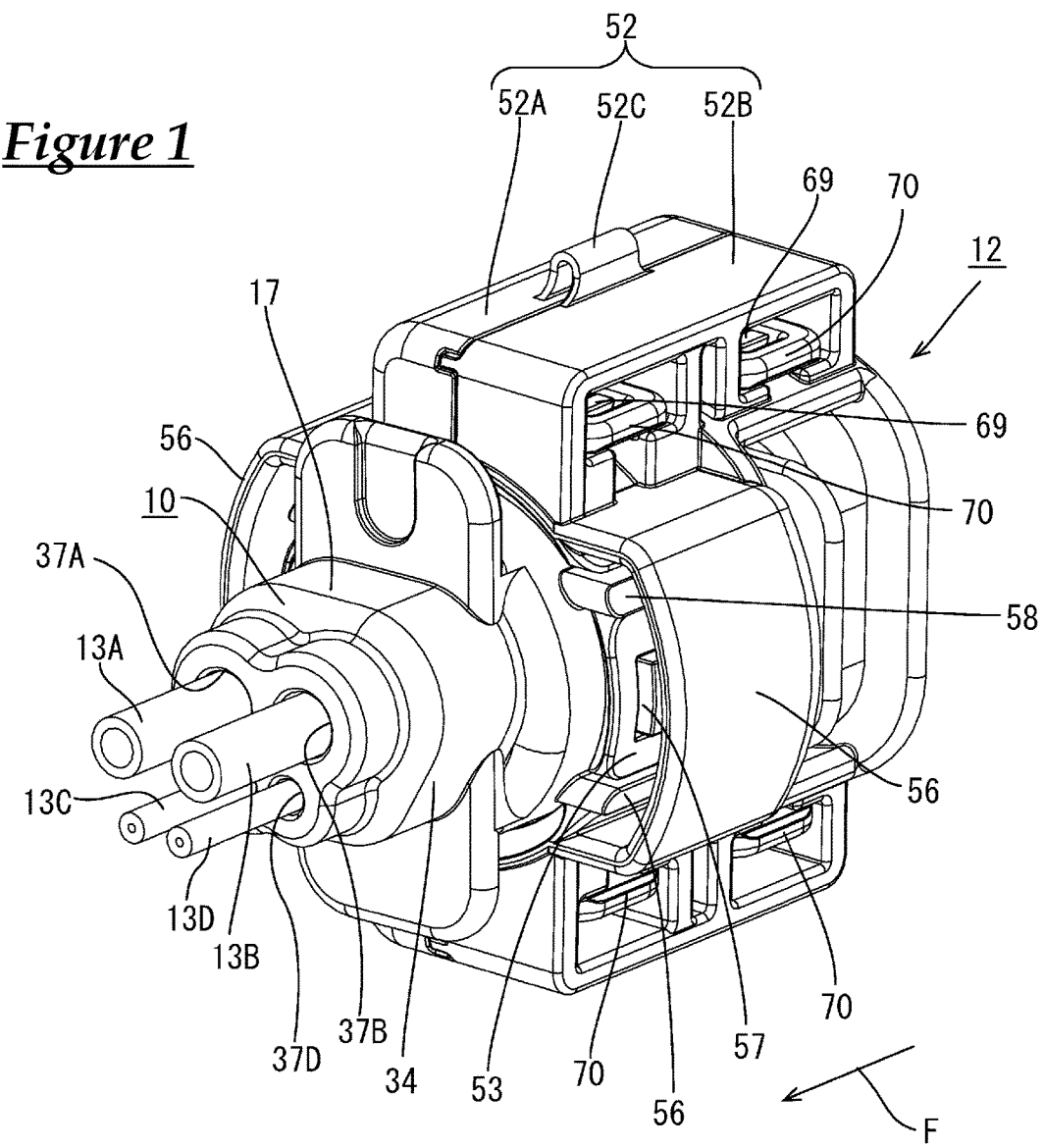
FIG. 1 is a perspective view showing a seal structure for a multicore cable according to Embodiment 1.
Figure 2:
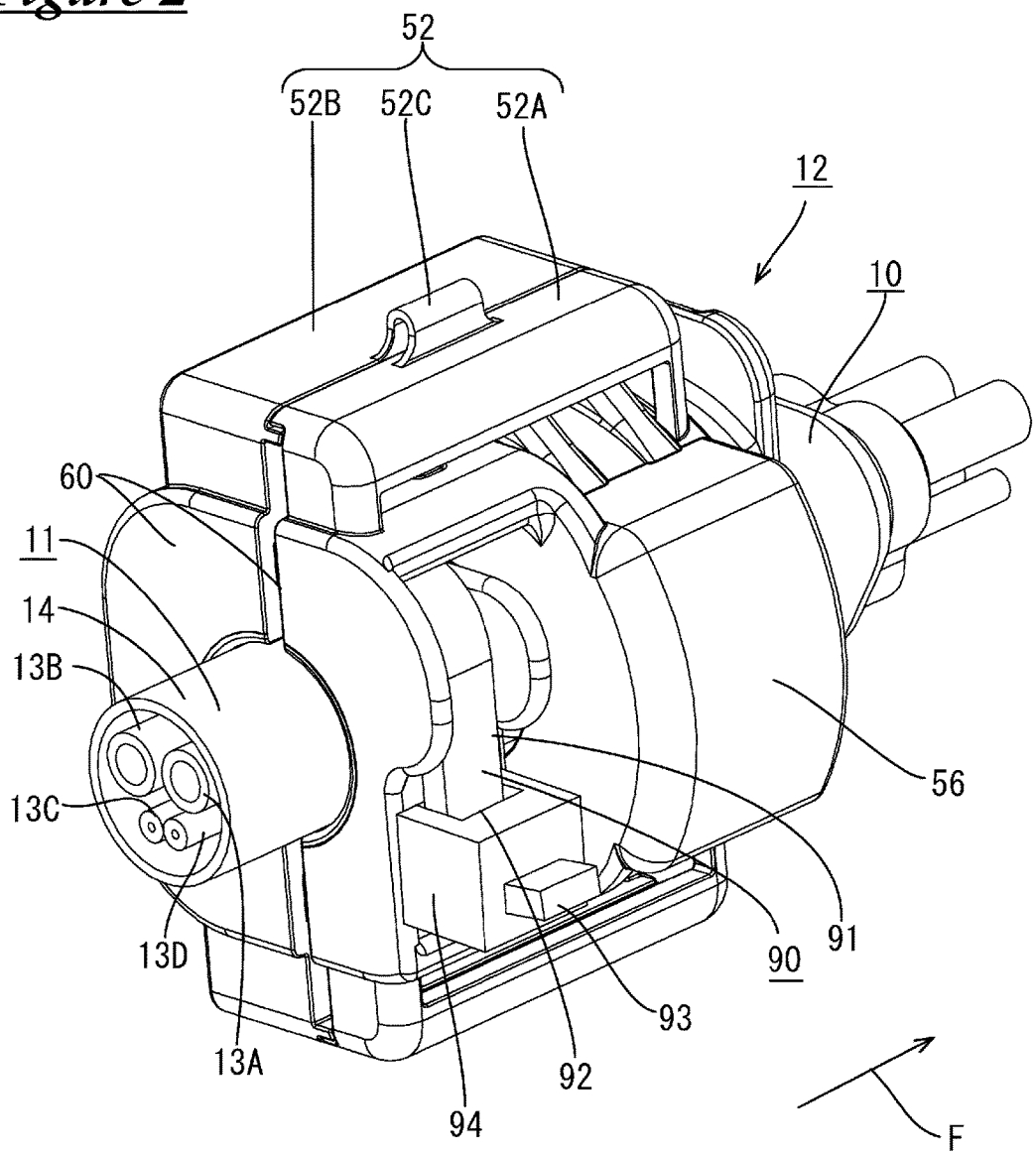
FIG. 2 is a perspective view showing the seal structure for a multicore cable viewed from a direction different from that in FIG. 1.
Figure 3:
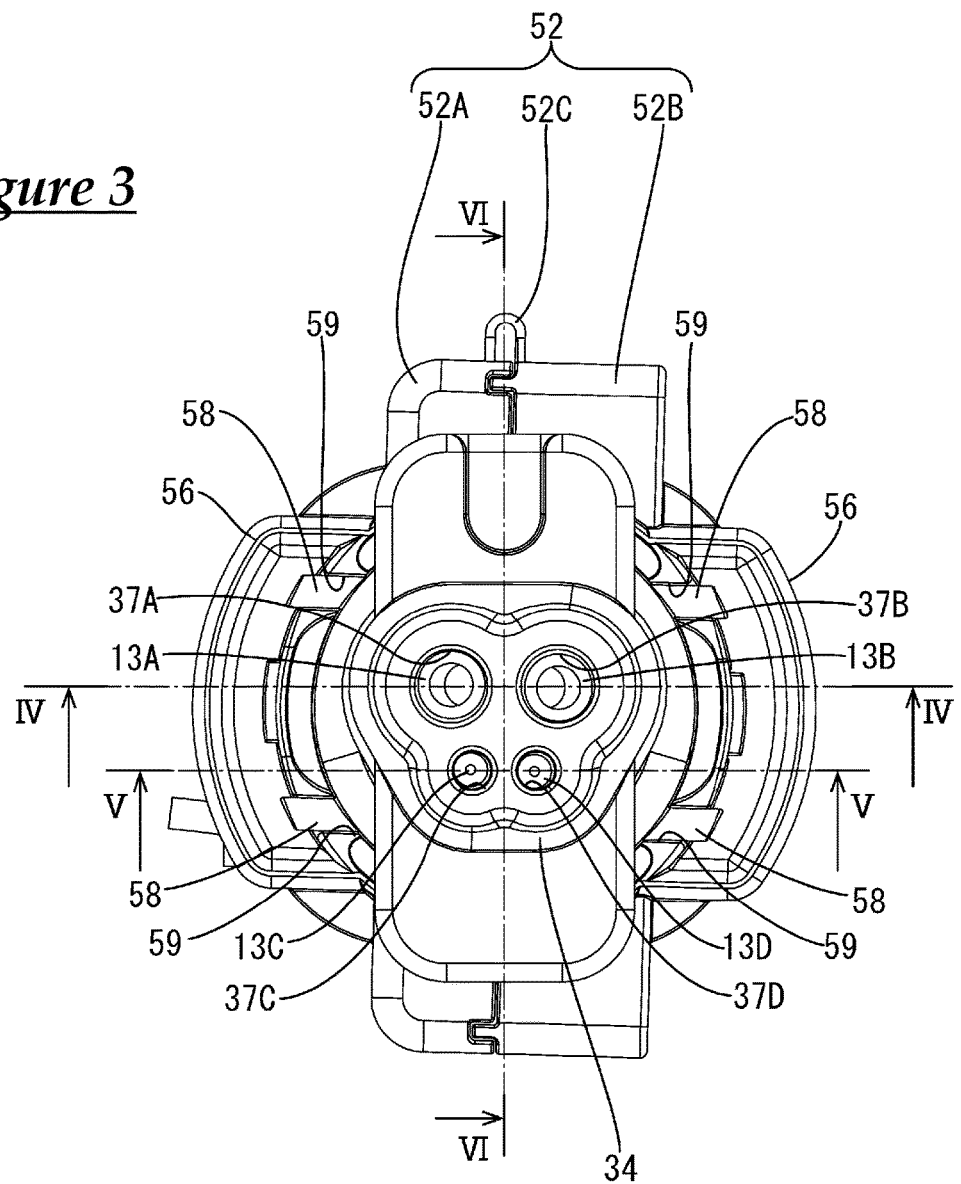
FIG. 3 is a front view showing the seal structure for a multicore cable.

As shown in FIG. 2, the multicore cable 11 according to the present embodiment has a configuration in which a plurality (four in the present embodiment) of electrical wires 13A, 13B, 13C, and 13D are enveloped by a sheath 14 that is made of an insulating synthetic resin. The electrical wires 13A, 13B, 13C, and 13D have a configuration in which the outer circumferential surface of a metal core wire (not shown) is covered by a synthetic resin insulating covering (not shown). The multicore cable 11 has a circular cross-section.

As shown in FIG. 2, the four electrical wires 13A, 13B, 13C, and 13D include two types of electrical wires 13A, 13B, 13C, and 13D that have different outer diameters. In the present embodiment, the first electrical wire 13A and the second electrical wire 13B are for connection to an electrical parking brake motor, and the third electrical wire 13C and the fourth electrical wire 13D are for an anti-lock brake system sensor. The first electrical wire 13A, the second electrical wire 13B, the third electrical wire 13C, and the fourth electrical wire 13D have circular cross-sections. Note that the applications of the first electrical wire 13A to the fourth electrical wire 13D are not limited to the above-described embodiment.

The outer diameters of the first electrical wire 13A and the second electrical wire 13B are set to be larger than the outer diameters of the third electrical wire 13C and the fourth electrical wire 13D. The outer diameter of the first electrical wire 13A is set to be the same as the outer diameter of the second electrical wire 13B. Also, the outer diameter of the third electrical wire 13C is set to be the same as the outer diameter of the fourth electrical wire 13D. The first electrical wire 13A, the second electrical wire 13B, the third electrical wire 13C, and the fourth electrical wire 13D extend and branch out from an end portion 14A of the sheath 14 of the multicore cable 11.

Figure 5:
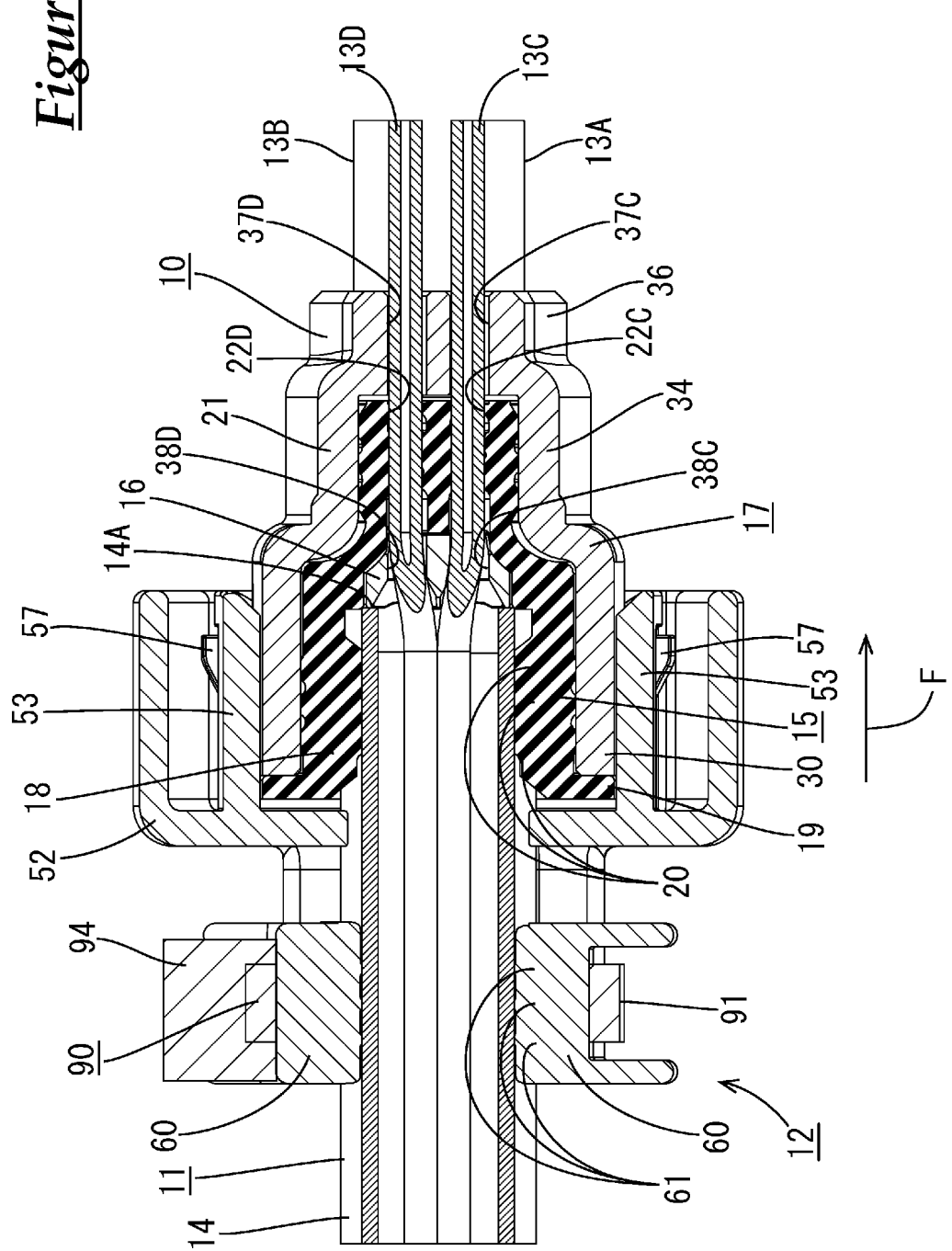
FIG. 5 is a cross-sectional view taken along line V-V in FIG. 3.
Figure 6:
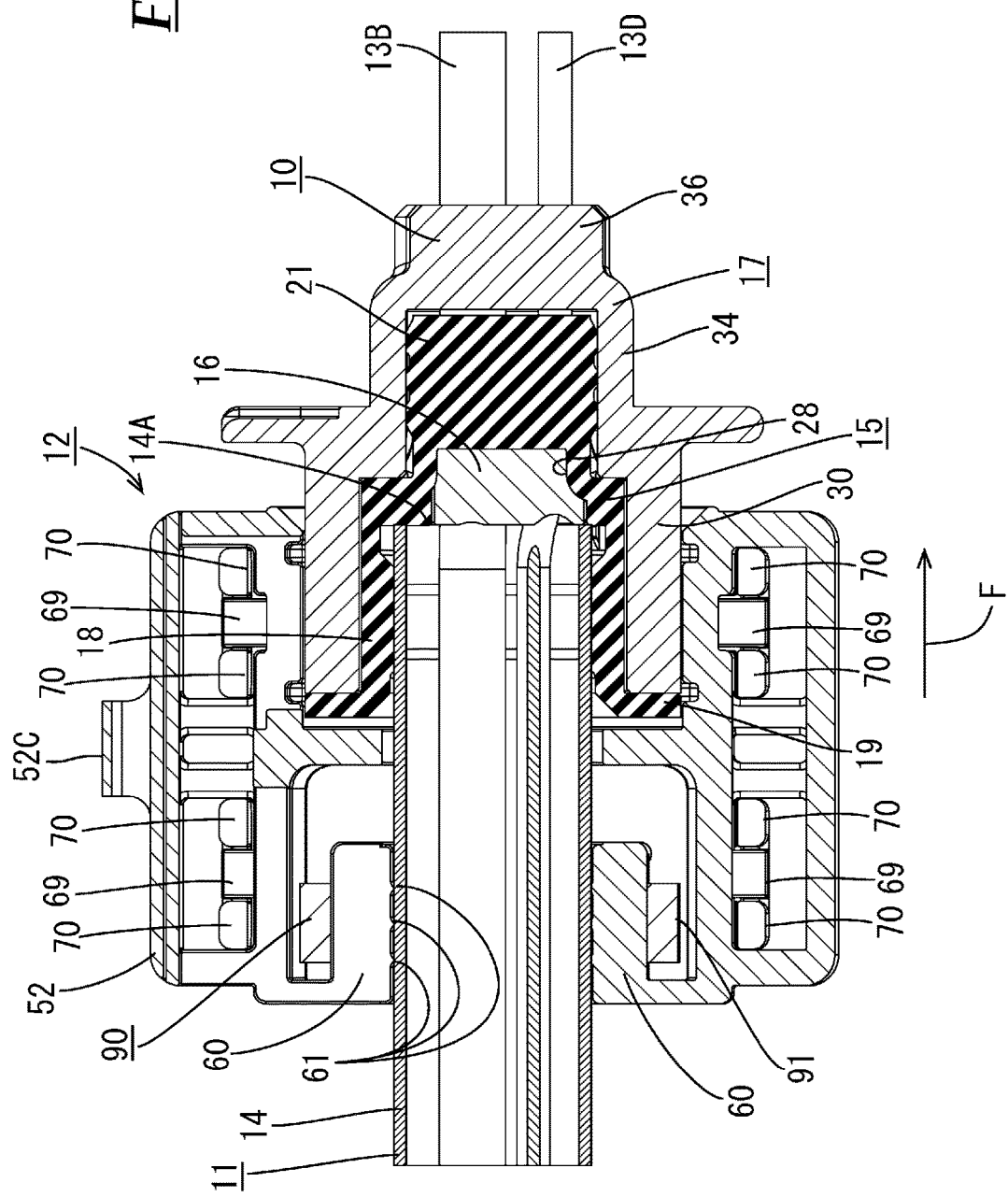
FIG. 6 is a cross-sectional view taken along line VI-VI in FIG. 3.

As shown in FIGS. 4 to 6, the seal member 10 is attached to the end portion 14A of the sheath 14 of the multicore cable 11, specifically to the region in which the first electrical wire 13A, the second electrical wire 13B, the third electrical wire 13C, and the fourth electrical wire 13D are branched. The intrusion of a liquid such as water or oil through the end portion 14A of the sheath 14 into the sheath 14 is suppressed by the seal member 10. The seal member 10 includes the rubber plug 15 that is fitted around the end portion 14A of the sheath 14, a guide member 16 that is attached to an inner portion of the rubber plug 15, and the cap 17 that is fitted around the rubber plug 15.

As shown in FIGS. 4 and 5, the rubber plug 15 is fitted around the end portion 14A of the sheath 14. The rubber plug 15 has a sheath fitting portion 18 that is shaped as a hood that is open rearward and is fitted around the end portion 14A of the sheath 14. In other words, the sheath fitting portion 18 is shaped as a hood that extends toward the side opposite to the end portion 14A of the sheath 14 (the left side in FIG. 4) and is open in a direction opposite to the end portion 14A of the sheath 14 (leftward in FIG. 4). A flange portion 19 that protrudes outward in the radial direction of the sheath fitting portion 18 is formed at an end edge portion of the sheath fitting portion 18. The sheath fitting portion 18 is shaped as a substantially circular tube in its natural state.

As shown in FIGS. 4, 5, and 6, a plurality of sheath-side lips 20 that protrude inward are formed as rings that extend along the circumferential direction of the sheath fitting portion 18 on the inner circumferential surface of the sheath fitting portion 18. In the state where the sheath fitting portion 18 is fitted around the end portion 14A of the sheath 14, the sheath-side lips 20 are in intimate contact with the outer circumferential surface of the sheath 14. This seals the rubber plug 15 and the sheath 14.

As shown in FIGS. 4, 5, and 6, an electrical wire through-hole portion 21 is provided at the front end portion (end portion that is opposite to the sheath fitting portion 18) of the rubber plug 15, and the electrical wire through-hole portion 21 has a plurality (four in the present embodiment) of through-holes 22A, 22B, 22C, and 22D for passage of the first electrical wire 13A, the second electrical wire 13B, the third electrical wire 13C, and the fourth electrical wire 13D respectively. The through-holes 22A, 22B, 22C, and 22D include a first through-hole 22A for passage of the first electrical wire 13A, a second through-hole 22B for passage of the second electrical wire 13B, a third through-hole 22C for passage of the third electrical wire 13C, and a fourth through-hole 22D for passage for the fourth electrical wire 13D.

Figure 7:
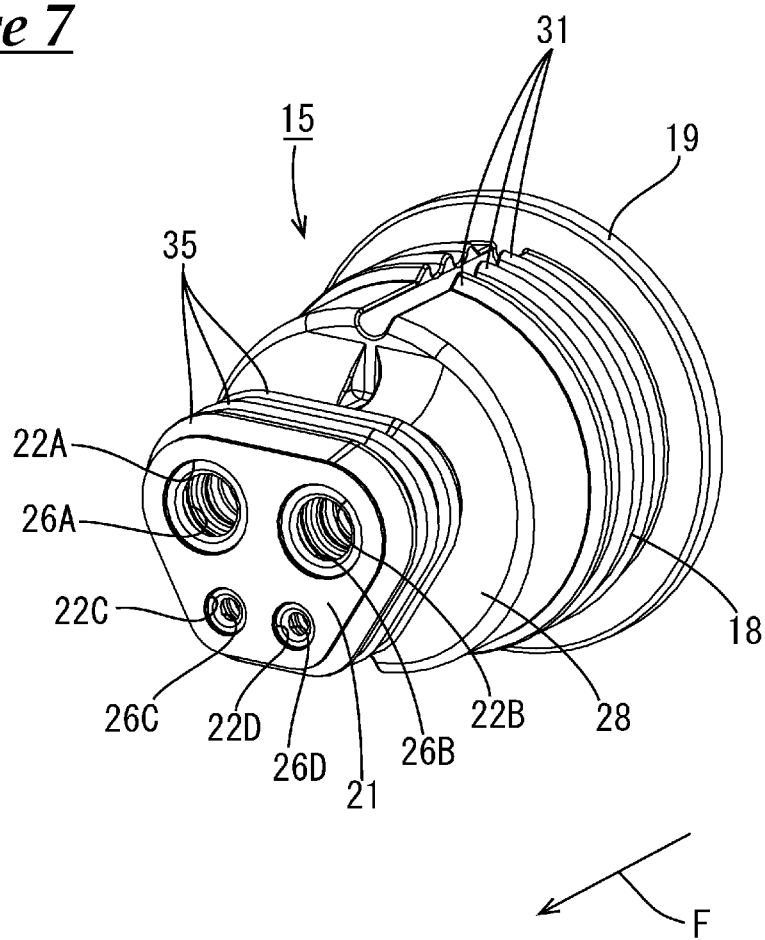
FIG. 7 is a perspective view showing a rubber plug.

As shown in FIG. 7, the cross-sectional shape of the electrical wire through-hole portion 21 is a trapezoid having rounded corners. The cross-sectional shape of the electrical wire through-hole portion 21 includes a long side, a short side that is shorter than the long side and is parallel with the long side, and two inclined sides that link end portions of the long side to end portions of the short side.

The first through-hole 22A and the second through-hole 22B are formed side-by-side along the direction in which the long side extends at positions in the electrical wire through-hole portion 21 that are arranged on the long side. Also, the third through-hole 22C and the fourth through-hole 22D are formed side-by-side along the direction in which the short side extends at positions in the electrical wire through-hole portion 21 that are arranged on the short side.

The inner diameter of the first through-hole 22A is somewhat larger than the outer diameter of the first electrical wire 13A. As shown in FIG. 7, first electrical wire-side lips 26A that come into intimate contact with the outer circumferential surface of the first electrical wire 13A are formed as rings that extend along the circumferential direction of the first through-hole 22A on the inner circumferential surface of the first through-hole 22A. In the state where the first electrical wire 13A passes through the interior of the first through-hole 22A, the first electrical wire-side lips 26A are in intimate contact with the outer circumferential surface of the first electrical wire 13A. This seals the first electrical wire 13A and the rubber plug 15.

The inner diameter of the second through-hole 22B is somewhat larger than the outer diameter of the second electrical wire 13B. As shown in FIG. 7, second electrical wire-side lips 26B that come into intimate contact with the outer circumferential surface of the second electrical wire 13B are formed as rings that extend along the circumferential direction of the second through-hole 22B on the inner circumferential surface of the second through-hole 22B. In the state where the second electrical wire 13B passes through the interior of the second through-hole 22B, the second electrical wire-side lips 26B are in intimate contact with the outer circumferential surface of the second electrical wire 13B. This seals the second electrical wire 13B and the rubber plug 15.

The inner diameter of the third through-hole 22C is somewhat larger than the outer diameter of the third electrical wire 13C. As shown in FIG. 7, third electrical wire-side lips 26C that come into intimate contact with the outer circumferential surface of the third electrical wire 13C are formed as rings that extend along the circumferential direction of the third through-hole 22C on the inner circumferential surface of the third through-hole 22C. In the state where the third electrical wire 13C passes through the interior of the third through-hole 22C, the third electrical wire-side lips 26C are in intimate contact with the outer circumferential surface of the third electrical wire 13C. This seals the third electrical wire 13C and the rubber plug 15.

The inner diameter of the fourth through-hole 22D is somewhat larger than the outer diameter of the fourth electrical wire 13D. As shown in FIG. 7, fourth electrical wire-side lips 26D that come into intimate contact with the outer circumferential surface of the fourth electrical wire 13D are formed as rings that extend along the circumferential direction of the fourth through-hole 22D on the inner circumferential surface of the fourth through-hole 22D. In the state where the fourth electrical wire 13D passes through the interior of the fourth through-hole 22D, the fourth electrical wire-side lips 26D are in intimate contact with the outer circumferential surface of the fourth electrical wire 13D. This seals the fourth electrical wire 13D and the rubber plug 15.

As shown in FIGS. 4 to 6, a holding portion 28 for holding the guide member 16 is formed at a position on the rubber plug 15 that is inside the sheath fitting portion 18 and between the sheath-side lips 20 and the electrical wire through-hole portion 21. The guide member 16 has a plurality (four in the present embodiment) of guide holes 38A, 38B, 38C, and 38D for passage of the first electrical wire 13A, the second electrical wire 13B, the third electrical wire 13C, and the fourth electrical wire 13D respectively.

As shown in FIGS. 4 to 6, the cap 17 made of a synthetic resin is fitted around the rubber plug 15. The cap 17 is fitted around the rubber plug 15 from the side (right side in FIG. 4) on which the first electrical wire 13A, the second electrical wire 13B, the third electrical wire 13C, and the fourth electrical wire 13D extend out from the end portion 14A of the sheath 14. The cap 17 is open toward the sheath 14 (leftward in FIG. 4) from the side from which the first electrical wire 13A, the second electrical wire 13B, the third electrical wire 13C, and the fourth electrical wire 13D extend out. The open end edge of the cap 17 is in contact with the flange portion 19 of the rubber plug 15.

Figure 8:
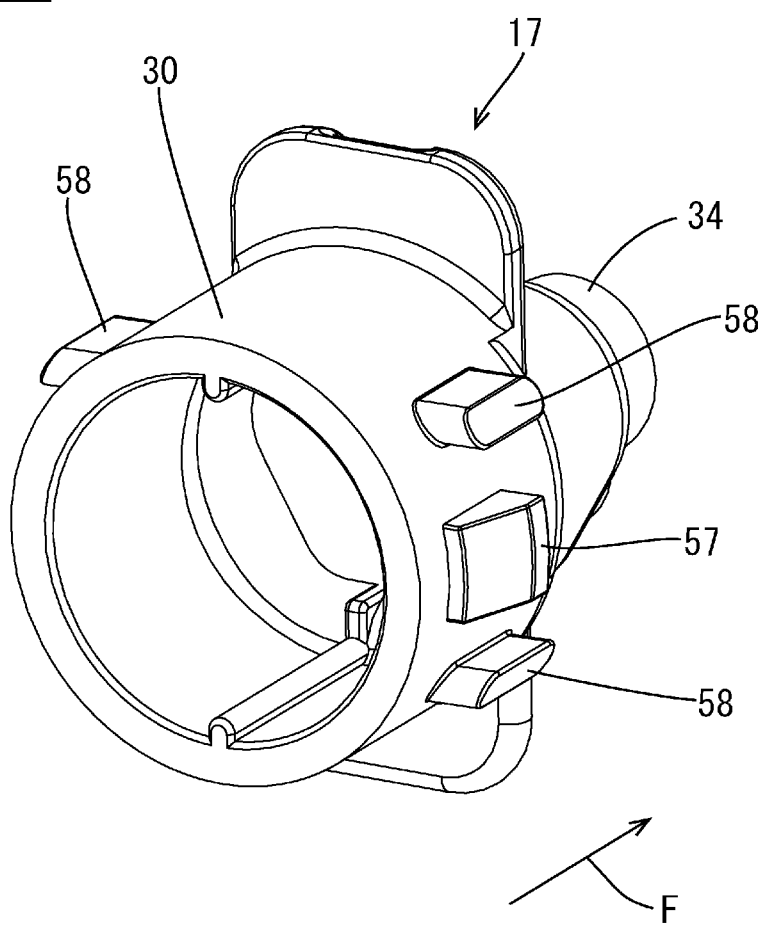
FIG. 8 is a perspective view showing a cap.

The cap 17 is provided with a wide portion 30 that is fitted around the sheath fitting portion 18 of the rubber plug 15 at a position on the open end edge side (left side in FIG. 4) of the cap 17. As shown in FIG. 8, the cross-sectional shape of the wide portion 30 is approximately circular and conforms to the outer shape of the sheath fitting portion 18. The inner circumferential surface of the wide portion 30 comes into intimate contact with a plurality (three in the present embodiment) of wide portion-side lips 31 that are formed on the outer circumferential surface of the sheath fitting portion 18. As shown in FIG. 7, the wide portion-side lips 31 are formed on the outer circumferential surface of the sheath fitting portion 18, protruding outward and extending along the circumferential direction of the sheath fitting portion 18. When the wide portion-side lips 31 and the inner circumferential surface of the wide portion 30 of the cap 17 are in intimate contact, the wide portion 30 of the cap 17 and the sheath fitting portion 18 of the rubber plug 15 are sealed.

As shown in FIGS. 4 to 6, in the state where the wide portion 30 of the cap 17 is fitted around the sheath fitting portion 18 of the rubber plug 15, the wide portion 30 presses the sheath fitting portion 18 inward in the radial direction of the sheath fitting portion 18. Accordingly, the sheath fitting portion 18 is pressed against the outer circumferential surface of the sheath 14 from the outside. Accordingly, the sheath-side lips 20 of the sheath fitting portion 18 reliably come into intimate contact with the outer circumferential surface of the sheath 14.

Figure 9:
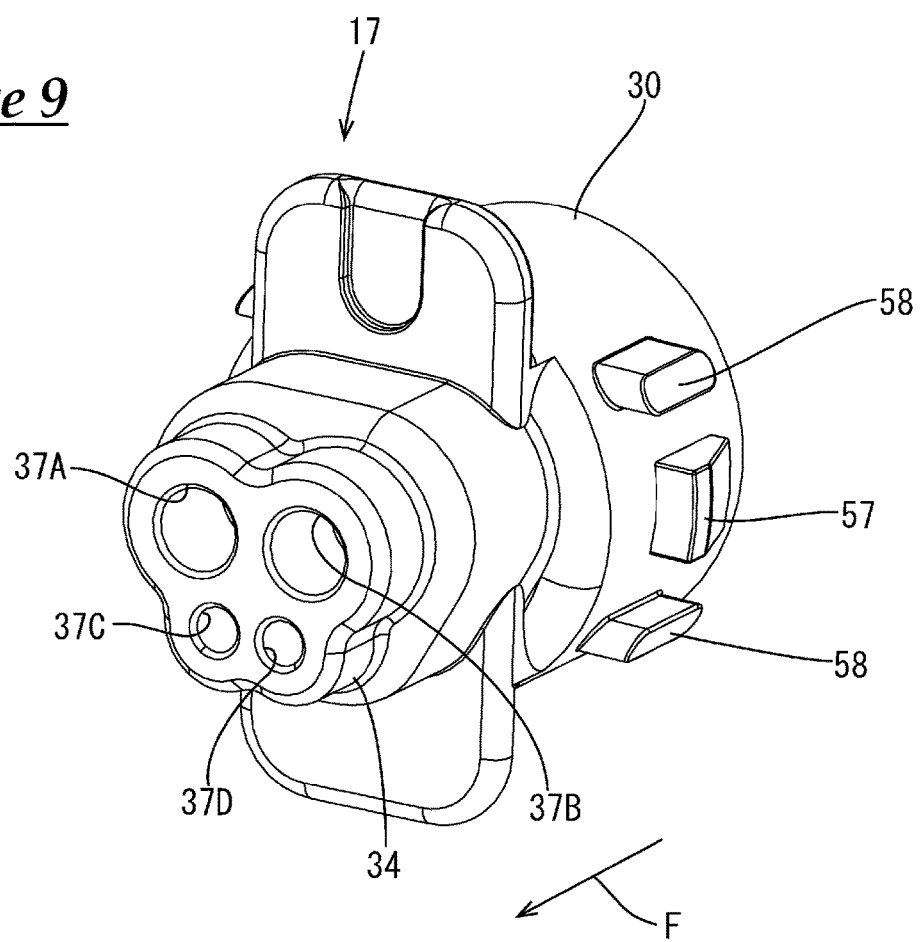
FIG. 9 is a perspective view showing the cap viewed from a direction different from that in FIG. 8.

As shown in FIGS. 4 to 6, a narrow portion 34 that is fitted around the electrical wire through-hole portion 21 of the rubber plug 15 is provided at a position in the cap 17 that is opposite (right side in FIG. 4, and frontward F) to the direction in which the cap 17 is open relative to the wide portion 30. The outer diameter of the narrow portion 34 is set to be smaller than the outer diameter of the wide portion 30. As shown in FIG. 9, the cross-sectional shape of the narrow portion 34 is a rounded-corner trapezoid that conforms to the outer shape of the electrical wire through-hole portion 21.

As shown in FIGS. 4 to 6, the inner circumferential surface of the narrow portion 34 comes into intimate contact with a plurality (three in the present embodiment) of narrow portion-side lips 35 formed on the outer circumferential surface of the electrical wire through-hole portion 21. As shown in FIG. 7, the narrow portion-side lips 35 are formed on the outer circumferential surface of the electrical wire through-hole portion 21, protruding outward and extending along the circumferential direction of the electrical wire through-hole portion 21. When the narrow portion-side lips 35 come into intimate contact with the inner circumferential surface of the narrow portion 34 of the cap 17, the narrow portion 34 of the cap 17 and the electrical wire through-hole portion 21 of the rubber plug 15 are sealed.

As shown in FIGS. 4 to 6, in the state where the narrow portion 34 of the cap 17 is fitted around the electrical wire through-hole portion 21 of the rubber plug 15, the narrow portion 34 presses the electrical wire through-hole portion 21 inward in the radial direction of the electrical wire through-hole portion 21. Accordingly, the electrical wire through-hole portion 21 is compressed from the outside. Accordingly, the first to fourth electrical wire-side lips 26A, 26B, 26C, and 26D formed on the inner circumferential surfaces of the first to fourth through-holes 22A, 22B, 22C, and 22D are reliably brought into intimate contact with the radially outer sides of the first to fourth electrical wires 13A, 13B, 13C, and 13D respectively.

As shown in FIGS. 4 to 6, the cap 17 is provided with a bottom wall 36 at a position that is opposite to the direction in which the cap 17 is open. As shown in FIG. 9, a first lead-out hole 37A, a second lead-out hole 37B, a third lead-out hole 37C, and a fourth lead-out hole 37D are formed in the bottom wall 36, passing through the bottom wall 36 such that the first electrical wire 13A, the second electrical wire 13B, the third electrical wire 13C, and the fourth electrical wire 13D respectively extend out from the cap 17.

As shown in FIGS. 4 to 6, the first to fourth through-holes 22A, 22B, 22C, and 22D formed in the rubber plug 15 are aligned with the first to fourth lead-out holes 37A, 37B, 37C, and 37D formed in the cap 17. More specifically, the first through-hole 22A and the first lead-out hole 37A are aligned with each other, the second through-hole 22B and the second lead-out hole 37B are aligned with each other, the third through-hole 22C and the third lead-out hole 37C are aligned with each other, and the fourth through-hole 22D and the fourth lead-out hole 37D are aligned with each other.

As shown in FIGS. 4 and 5, the guide member 16 is made of a synthetic resin, and is provided with a first guide hole 38A for passage of the first electrical wire 13A, a second guide hole 38B for passage of the second electrical wire 13B, a third guide hole 38C for passage of the third electrical wire 13C, and a fourth guide hole 38D for passage of the fourth electrical wire 13D.

As shown in FIGS. 4 and 5, the first to fourth through-holes 22A, 22B, 22C, and 22D of the rubber plug 15 are respectively aligned with the first to fourth guide holes 38A, 38B, 38C, and 38D of the guide member 16. More specifically, the first through-hole 22A and the first guide hole 38A are aligned with each other, the second through-hole 22B and the second guide hole 38B are aligned with each other, the third through-hole 22C and the third guide hole 38C are aligned with each other, and the fourth through-hole 22D and the fourth guide hole 38D are aligned with each other.

Figure 10:
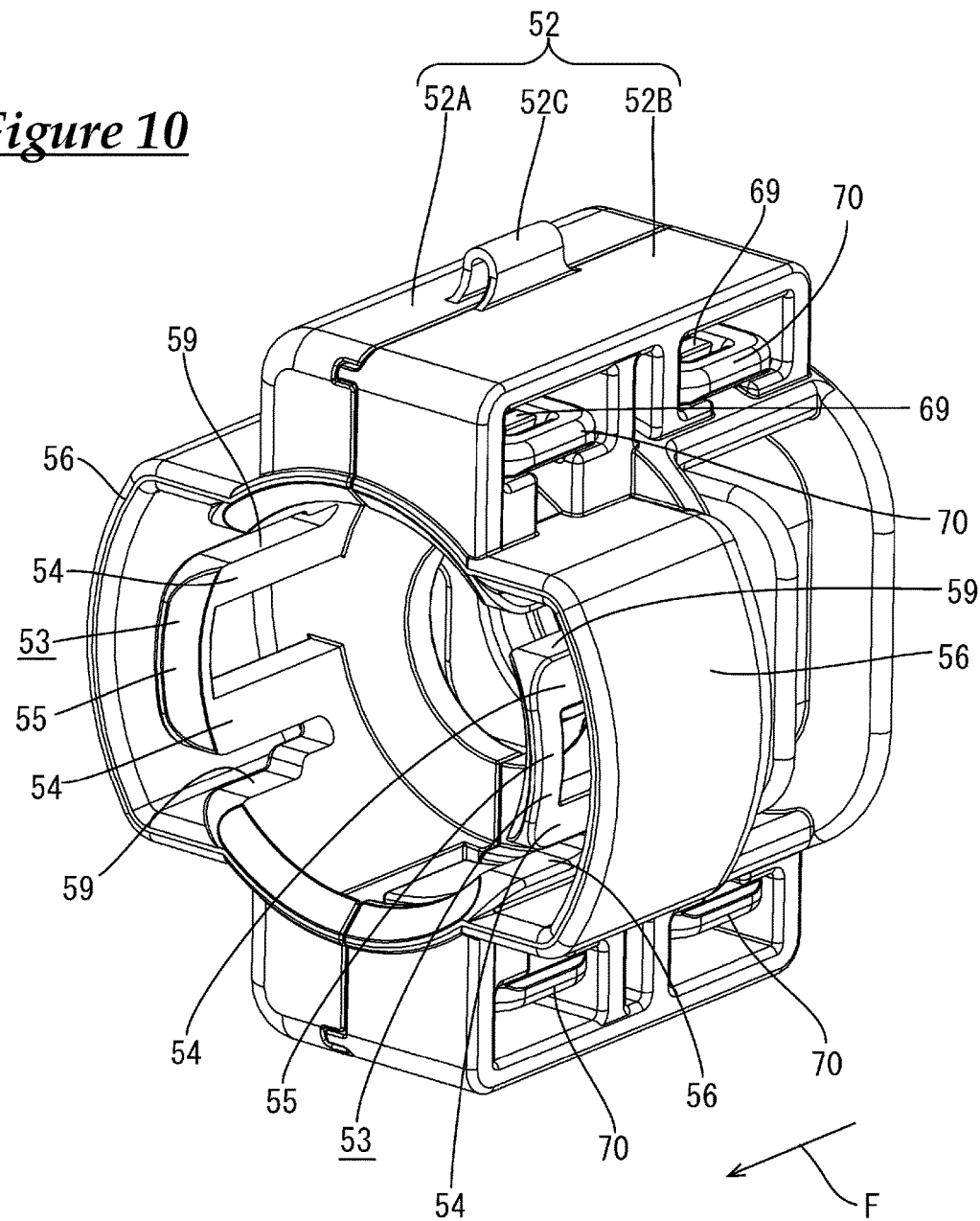
FIG. 10 is a perspective view showing a holder.

As shown in FIG. 10, the holder 52 includes a first holder 52A and a second holder 52B formed integrally with this first holder 52A via a hinge 52C. The first holder 52A and the second holder 52B are attached to each other by elastic engagement of locking portions 69 and locking reception portions 70.

As shown in FIGS. 4 and 5, a rear end portion of the holder 52 is provided with the sheath holding portions 60 configured to hold the sheath 14 from the outside. The sheath holding portions 60 are provided with holding ribs 61 that protrude inwardly and extend in the circumferential direction of the sheath holding portions 60. A plurality (three in the present embodiment) of the holding ribs 61 are spaced apart from each other in the longitudinal direction. The holding ribs 61 hold the sheath 14 by coming into contact with the outer circumferential surface of the sheath 14 from the outside. Accordingly, shifting of relative positions of the multicore cable 11 and the holder 52 is suppressed.

Figure 11:
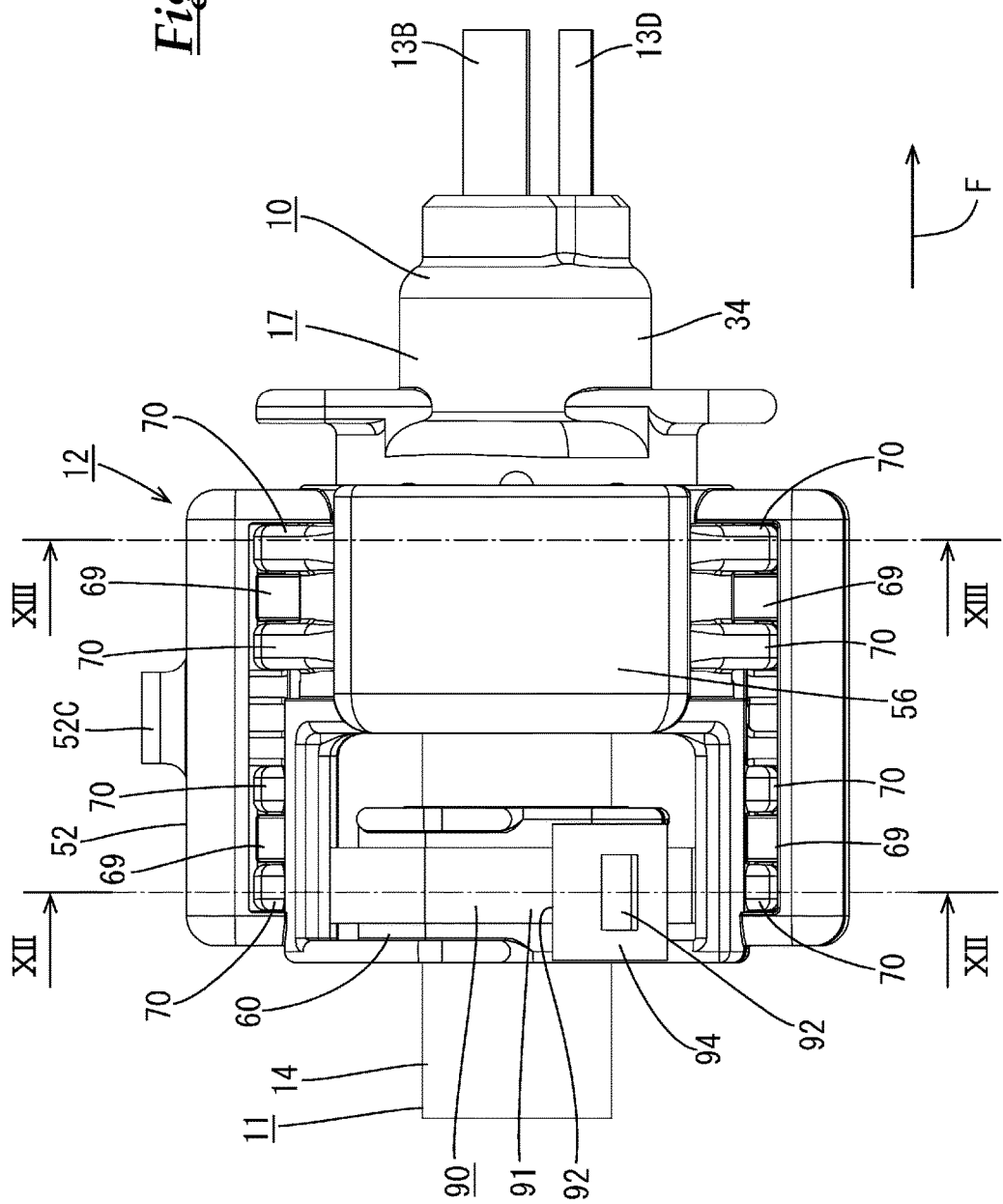
FIG. 11 is a plan view showing the seal structure for a multicore cable.

As shown in FIG. 11, a binding member 90 is wrapped around the sheath holding portions 60. The sheath holding portions 60 are pressed inward in the radial direction by this binding member 90. Accordingly, the inner circumferential surface of the sheath 14 and the outer surfaces of the first to fourth electrical wires 13A, 13B, 13C, and 13D are in intimate contact with each other. As a result, the sheath 14 and the first to fourth electrical wires 13A, 13B, 13C, and 13D are positioned.

Figure 12:
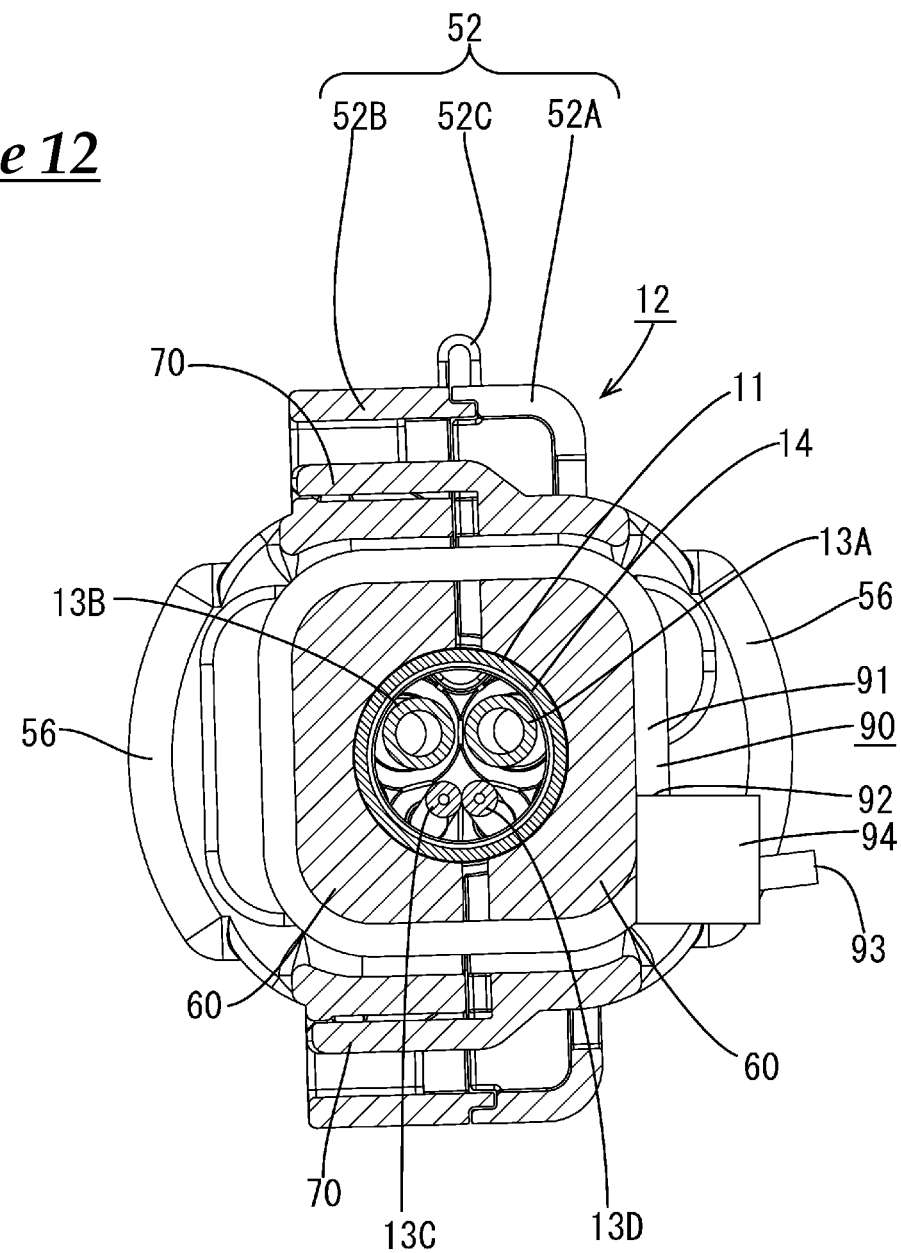
FIG. 12 is a cross-sectional view taken along line XII-XII in FIG. 11.

As shown in FIGS. 2 and 12, the binding member 90 includes a band portion 91 having a belt shape, a retaining portion 94 that is attached to one end portion 92 of the band portion 91 and is configured to retain the other end portion 93 of the band portion 91 in a direction opposite to the direction in which the band portion 91 pass through the retaining portion 94, in a state in which the other end portion 93 of the band portion 91 passes through the retaining portion 94. The binding member 90 may also be made of a synthetic resin or metal, and any material can be selected as appropriate as necessary. Also, a known structure can be selected as the binding member 90 as appropriate.

Although not shown in detail, the retaining portion 94 has an insertion hole for passage of the band portion 91. The inner surface of the insertion hole is provided with an engagement reception portion (not shown) configured to lock to an engagement portion (not shown) formed in the band portion 91. When the engagement portion of the band portion 91 locks to the engagement reception portion of the retaining portion 94, the other end portion 93 of the band portion 91 is retained in the direction opposite to the direction in which the band portion 91 passes through the retaining portion 94.

As shown in FIG. 10, a front end portion of the holder 52 is shaped as a hood that is open frontward. The cap 17 is fitted into the holder 52 from the front of the holder 52.

The front end portion of the holder 52 is provided with two locking portions 53 (one example of a rubber plug holding portion) that extend frontward. The locking portion 53 is approximately gate-shaped, and has two elastic deformation portions 54 and a linking portion 55 that links the front end portions of the elastic deformation portions 54. The two locking portions 53 are formed at symmetrical positions in the holder 52.

The front end portions of the holder 52 are provided with protection portions 56 that cover the locking portions 53. The front end portion of the locking portion 53 is arranged at the same position as the front end portion of the protection portion 56 or at a position that is lower than the front end portion of the protection portion 56 slightly rearward in the longitudinal direction. Accordingly, the protection portion 56 suppresses collision of foreign matter with the locking portion 53.

As shown in FIGS. 8 and 9, the outer surface of the cap 17 is provided with locking protrusions 57 protruding outward. The rear surface of the locking protrusions 57 is formed as a gently inclined surface, and the front surface of the locking protrusion 57 is formed in an upright shape with respect to the outer surface of the cap 17.

When the cap 17 is fitted from the front of the holder 52, the rear surfaces of the locking protrusions 57 and the linking portions 55 of the locking portions 53 come into contact with each other. The elastic deformation portions 54 of the locking portions 53 undergo elastic deformation outwardly in the radial direction of the cap. Furthermore, when the cap 17 is pushed into the holder 52, the linking portions 55 get over the locking protrusions 57, and the elastic deformation portions 54 undergo return deformation. When the linking portions 55 come into contact with the front surfaces of the locking protrusions 57 from the front, the cap is prevented from coming off frontward. Accordingly, shifting of relative positions of the multicore cable 11 and the holder 52 in the longitudinal direction is suppressed (see FIG. 4).

Also, when the holder 52 engages with the cap 17, shifting of relative positions of the holder 52 and the rubber plug 15 around which the cap 17 is fitted is suppressed.

As shown in FIGS. 8 and 9, the cap 17 is provided with two guide ribs 58 (one example of the guide portion) that protrude outward and extend in the longitudinal direction at positions located on the side of the locking protrusions 57. On the other hand, the holder is provided with guide grooves 59 (one example of the guided portion) for receiving the guide ribs 58 at positions located on the side of the locking portions 53, the guide grooves extending in the longitudinal direction. When the guide ribs 58 slide against the inner surfaces of the guide grooves 59, the cap 17 is guided to a position at which the locking protrusions 57 of the cap 17 and the locking portions 53 of holder 52 elastically lock to each other.

Figure 13:
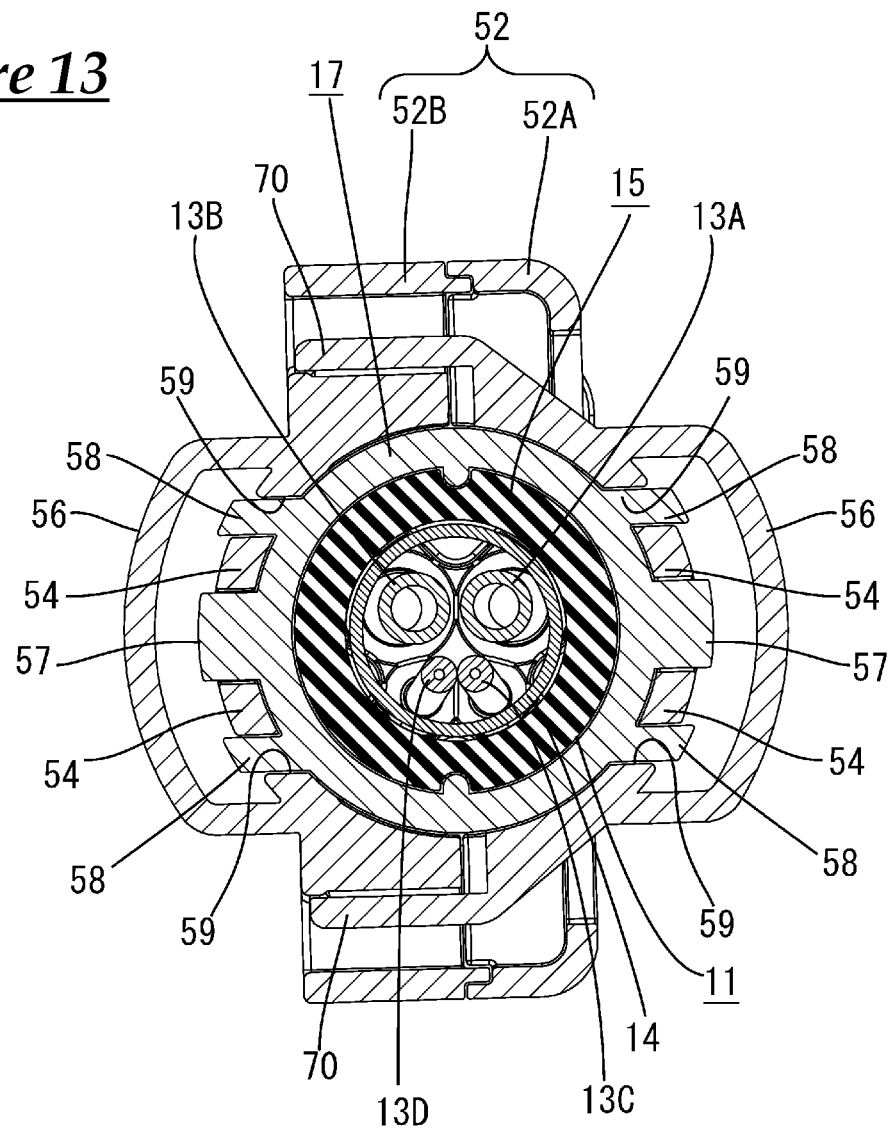
FIG. 13 is a cross-sectional view taken along line XIII-XIII in FIG. 11.

As shown in FIG. 13, the outer surfaces of the guide ribs 58 and the inner surfaces of the guide grooves 59 come into contact with each other in the circumferential direction of the cap, and thereby shifting of the position of the cap in the circumferential direction is reliably suppressed.

Effects of Embodiments

Next, the effects of the present embodiment will be described. The seal structure 12 for the multicore cable 11 according to the present embodiment includes the multicore cable 11 in which the first electrical wire 13A to the fourth electrical wire 13D are enveloped by the sheath 14, the rubber plug 15 that is fitted around the end portion 14A of the sheath 14 and have the first to fourth through-holes 22A to 22D through which the first to fourth electrical wires 13A to 14D respectively pass, and the holder 52 having the sheath holding portion 60 configured to hold the sheath 14 and suppress shifting of the position of the sheath 14 relative to the multicore cable 11, in which the holder 52 has the locking portions 53 configured to hold the rubber plug 15 and suppress movement of the rubber plug 15 in a direction (frontward F) in which the rubber plug 15 comes off from the end portion 14A of the sheath 14.

This prevents the rubber plug 15 from coming off from the end portion 14A of the sheath 14. Also, the sheath 14 is held by the holder 52 by the sheath holding portion 60. As a result, relative positions of the sheath 14 and the rubber plug 15 in the longitudinal direction are held by the holder 52. Accordingly, the rubber plug 15 is reliably pressed against the sheath 14 and the first electrical wire 13A to the fourth electrical wire 13D, and thus it is possible to improve the sealing property of the multicore cable 11.

The cap 17 that is fitted around the rubber plug 15 is included, and movement of the rubber plug 15 in a direction (frontward F) in which the rubber plug 15 comes off from the end portion of the sheath 14 is suppressed by engagement of the locking portions 53 and the cap 17.

According to the above-described configuration, because an internal pressure can be applied to the rubber plug 15 by the cap 17 that is fitted around the rubber plug 15, the sealing property of the multicore cable 11 can be further improved.

Also, according to the present embodiment, the cap 17 is provided with the guide ribs 58, the holder 52 is provided with the guide grooves 59 configured to slide against the guide ribs 58, and when the guide ribs 58 slide against the guide grooves 59, the locking portions 53 are guided to positions at which the locking portions 53 lock to the cap 17.

According to the above-described configuration, it is possible to reliably lock the holder 52 and the cap 17 together, and thus to reliably improve the sealing property of the multicore cable 11.

Also, according to the present embodiment, the holder 52 has protection portions 56 that cover the locking portions 53.

According to the above-described configuration, contact of foreign matter with the locking portions 53 is suppressed. This suppresses the release of the structure in which the locking portions 53 and the cap 17 (rubber plug 15) are locked together, and thus the sealing property of the multicore cable 11 can be further improved.

The binding member 90 is wrapped around the sheath holding portion 60 in a state in which the sheath holding portion 60 is pressed inward in the radial direction.

According to the above-described configuration, the sheath 14 is pressed inward in the radial direction of the sheath 14 by the binding member 90. As a result, the inner circumferential surface of the sheath 14 and the outer surfaces of the first electrical wire 13A to the fourth electrical wire 13D are in intimate contact with each other, and thus the sheath 14 and the first electrical wire 13A to the fourth electrical wire 13D are reliably fixed to each other.

Other Embodiments

The technology disclosed in the present specification is not limited to the embodiments described above using the foregoing description and drawings, and embodiments such as the following are also encompassed in the technical scope of the present invention.

The number of electrical wires arranged in the multicore cable 11 may also be two, three, five or more.

Although the plurality of electrical wires are configured to include two types of electrical wires having different outer diameters, the present invention is not limited to this, and a configuration is also possible in which the electrical wires include three or more types of electrical wires having different outer diameter.

The outer diameters of the plurality of electrical wires may also be the same.

The electrical wires may also be shielded electrical wires. Also, the electrical wires may be stranded wires that include a core wire obtained by twisting a plurality of metal strands, or may be so-called single-core wires in which the core wire is a metal rod member. In this way, any electrical wires can be appropriately selected as necessary as the electrical wire.

The multicore cable 11 may also be a so-called cab tire cable, or may be a multicore shielded wire in which a plurality of electrical wires are enveloped by a shielding layer. In this way, any multicore cable 11 can be appropriately selected as necessary as the multicore cable 11.

According to the seal member 10 of the present embodiment, any liquid such as water, oil, or an organic solvent can be sealed out as necessary.

Although in the present embodiment, a configuration was adopted in which the cap 17 is provided with the guide ribs 58 and the holder is provided with the guide grooves 59, the present invention is not limited to this, and a configuration is also possible in which the cap 17 is provided with guide grooves and the holder 52 is provided with guide ribs.

The number of guide ribs 58 formed on the cap 17 may also be one, two, three, four, or more.

The cap 17 may also be omitted. In this case, the rubber plug 15 locks to the locking portions 53 of the holder 52.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11 Multicore cable
12 Seal structure
13A First electrical wire
13B Second electrical wire
13C Third electrical wire
13D Fourth electrical wire
14 Sheath
15 Rubber plug
17 Cap
22A First through-hole
22B Second through-hole
22C Third through-hole
22D Fourth through-hole
52 Holder
53 Locking portion (rubber plug holding portion)
56 Protection portion
58 Guide rib
59 Guide groove
60 Sheath holding portion
62 Cap holding portion
65A First electrical wire routing portion
65B Second electrical wire routing portion
67 Bracket
90 Binding member
F Frontward (direction in which rubber plug comes off from end portion of sheath)

The invention claimed is:

1. A seal structure for a multicore cable, comprising:
a multicore cable in which a plurality of electrical wires are enveloped by a sheath;
a rubber plug that is fitted around an end portion of the sheath, the rubber plug has a plurality of through-holes through which the plurality of electrical wires respectively pass;
a cap that is fitted around the rubber plug, the cap including a plurality of lead-out holes in which the plurality of electrical wires respectively extend out from; and
a holder having a sheath holding portion configured to hold the sheath and suppress shifting of a position of the sheath relative to the multicore cable,
wherein the holder has a rubber plug holding portion configured to hold the rubber plug and suppress movement of the rubber plug in a direction in which the rubber plug comes off from the end portion of the sheath.

2. The seal structure for a multicore cable according to claim 1,
wherein movement of the rubber plug in a direction in which the rubber plug comes off from the end portion of the sheath is suppressed by engagement of the rubber plug holding portion and the cap.

3. The seal structure for a multicore cable according to claim 2,
wherein one of the holder and the cap is provided with a guide portion, and the other of the holder and the cap is provided with a guided portion configured to slide against the guide portion, and
the rubber plug holding portion is guided by the guide portion and the guided portion sliding against each other, to a position at which the rubber plug holding portion is locked to the cap.

4. The seal structure for a multicore cable according to claim 1,
wherein the holder has a protection portion that covers the rubber plug holding portion.

5. The seal structure for a multicore cable according to claim 1,
wherein the sheath holding portion of the holder is configured to hold the sheath from the outside, and
a binding member is wrapped around the sheath holding portion in a state in which the sheath holding portion is pressed inward in a radial direction.

* * * * *